United States Patent
Kondo et al.

(10) Patent No.: US 8,503,828 B2
(45) Date of Patent: Aug. 6, 2013

(54) IMAGE PROCESSING DEVICE, IMAGE PROCESSING METHOD, AND COMPUTER PROGRAM FOR PERFORMING SUPER RESOLUTION

(75) Inventors: Yuhi Kondo, Tokyo (JP); Takefumi Nagumo, Kanagawa (JP); Jun Luo, Tokyo (JP)

(73) Assignee: Sony Corporation, Tokyo (JP)

( * ) Notice: Subject to any disclaimer, the term of this patent is extended or adjusted under 35 U.S.C. 154(b) by 299 days.

(21) Appl. No.: 13/082,920

(22) Filed: Apr. 8, 2011

(65) Prior Publication Data

US 2011/0274368 A1 Nov. 10, 2011

(30) Foreign Application Priority Data

May 10, 2010 (JP) ................ P2010-108408

(51) Int. Cl.
*G06K 9/40* (2006.01)
*G06K 9/32* (2006.01)
*H04N 5/228* (2006.01)

(52) U.S. Cl.
USPC ............ 382/299; 382/275; 348/208.4

(58) Field of Classification Search
USPC ...... 348/208.4, 333.11; 375/240.16; 382/148, 382/275, 299–301
See application file for complete search history.

(56) References Cited

U.S. PATENT DOCUMENTS

| | | | | |
|---|---|---|---|---|
| 7,764,848 | B2 * | 7/2010 | Ida et al. | 382/299 |
| 8,036,488 | B2 * | 10/2011 | Nagumo | 382/275 |
| 8,254,726 | B2 * | 8/2012 | Ichihashi et al. | 382/300 |
| 8,269,843 | B2 * | 9/2012 | Luo et al. | 348/208.4 |
| 8,306,121 | B2 * | 11/2012 | Jia | 375/240.16 |
| 8,346,012 | B2 * | 1/2013 | Nagumo | 382/275 |
| 8,369,649 | B2 * | 2/2013 | Nagumo | 382/275 |
| 2007/0091997 | A1 * | 4/2007 | Fogg et al. | 375/240.1 |
| 2009/0092337 | A1 * | 4/2009 | Nagumo | 382/299 |
| 2010/0119176 | A1 * | 5/2010 | Ichihashi et al. | 382/300 |
| 2011/0274370 | A1 * | 11/2011 | Kondo et al. | 382/284 |
| 2012/0019725 | A1 * | 1/2012 | Nagumo | 348/584 |

FOREIGN PATENT DOCUMENTS

JP 2008-140012 6/2008

* cited by examiner

*Primary Examiner* — Andrae S Allison
(74) *Attorney, Agent, or Firm* — Finnegan, Henderson, Farabow, Garrett & Dunner, LLP

(57) ABSTRACT

An image processing device for super resolution is disclosed. The device comprises an upsampling section, a motion compensated image generating section, a blend processing section and an output image generating section wherein filtering processing necessary for generating a difference information is performed twice or less, so that miniaturization of the device and an improvement in processing efficiency are achieved.

8 Claims, 5 Drawing Sheets

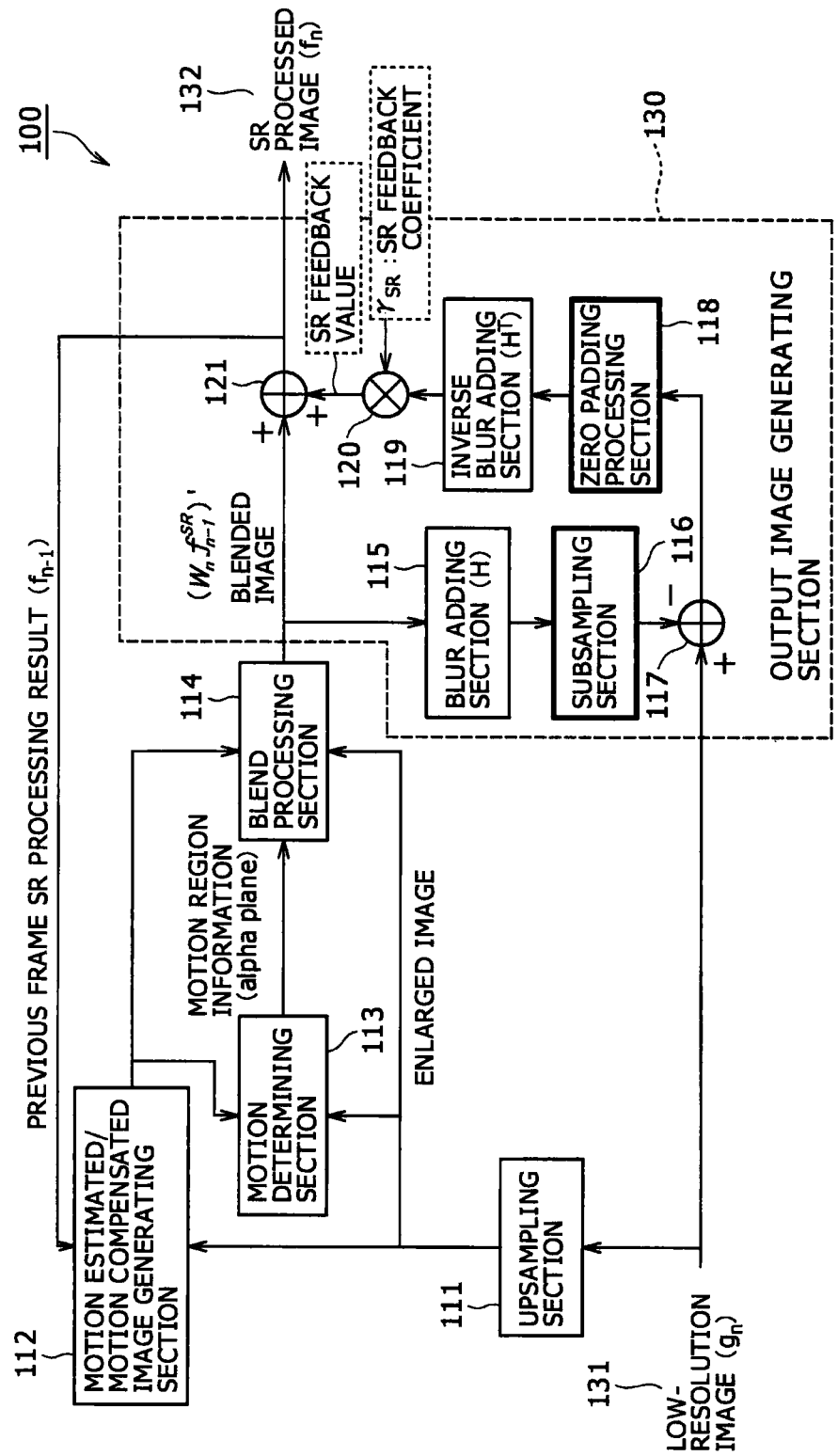

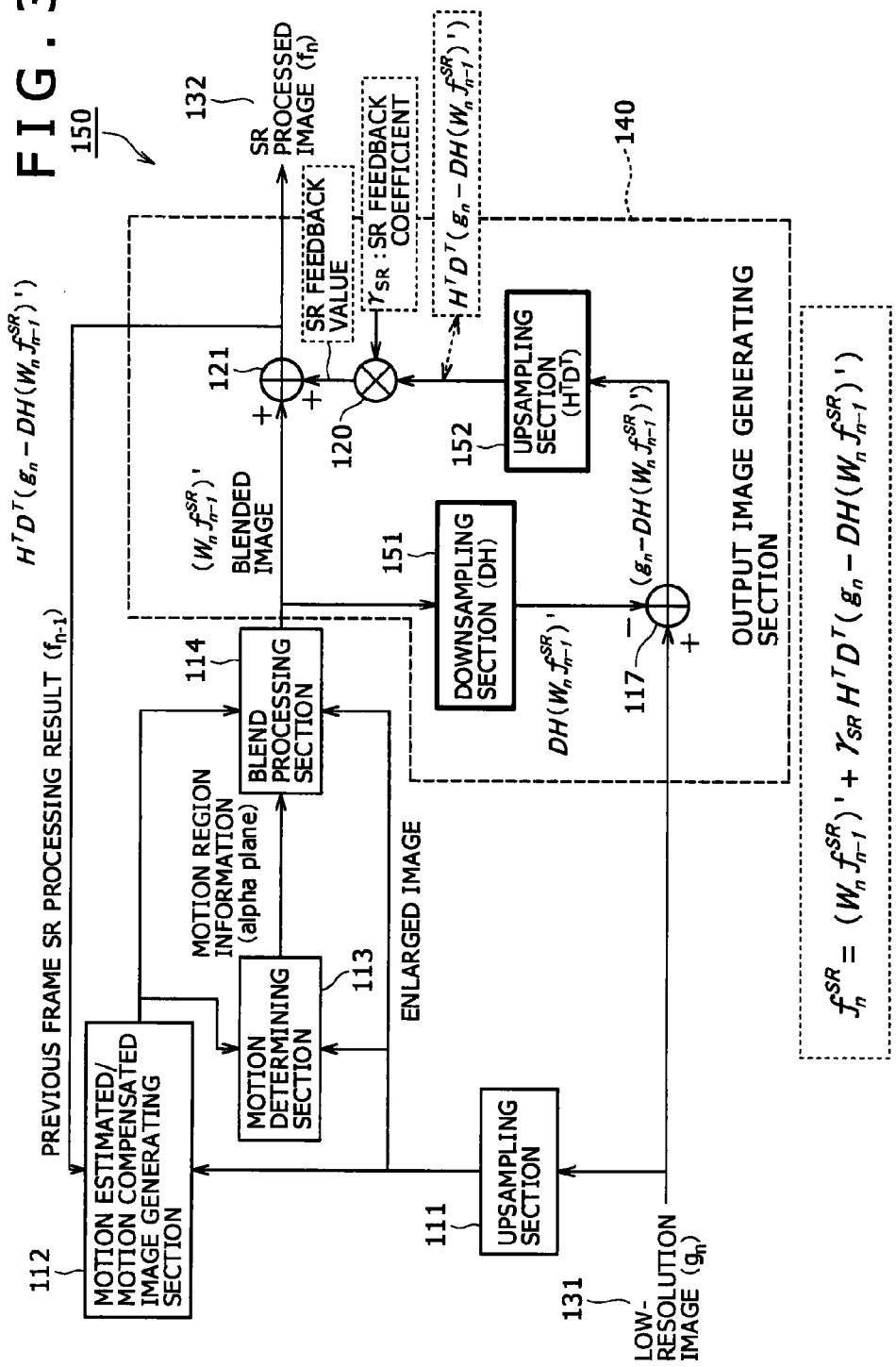

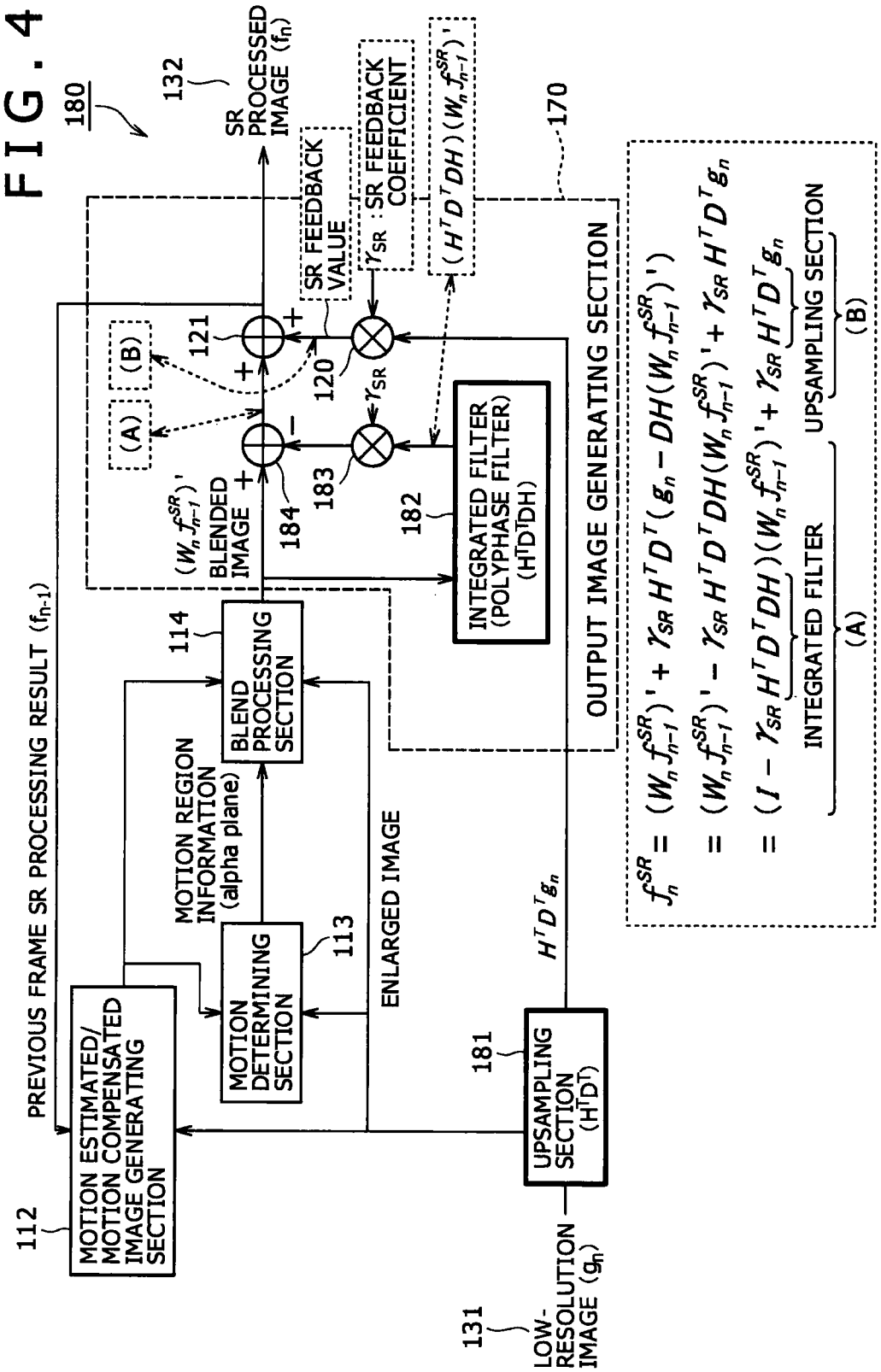

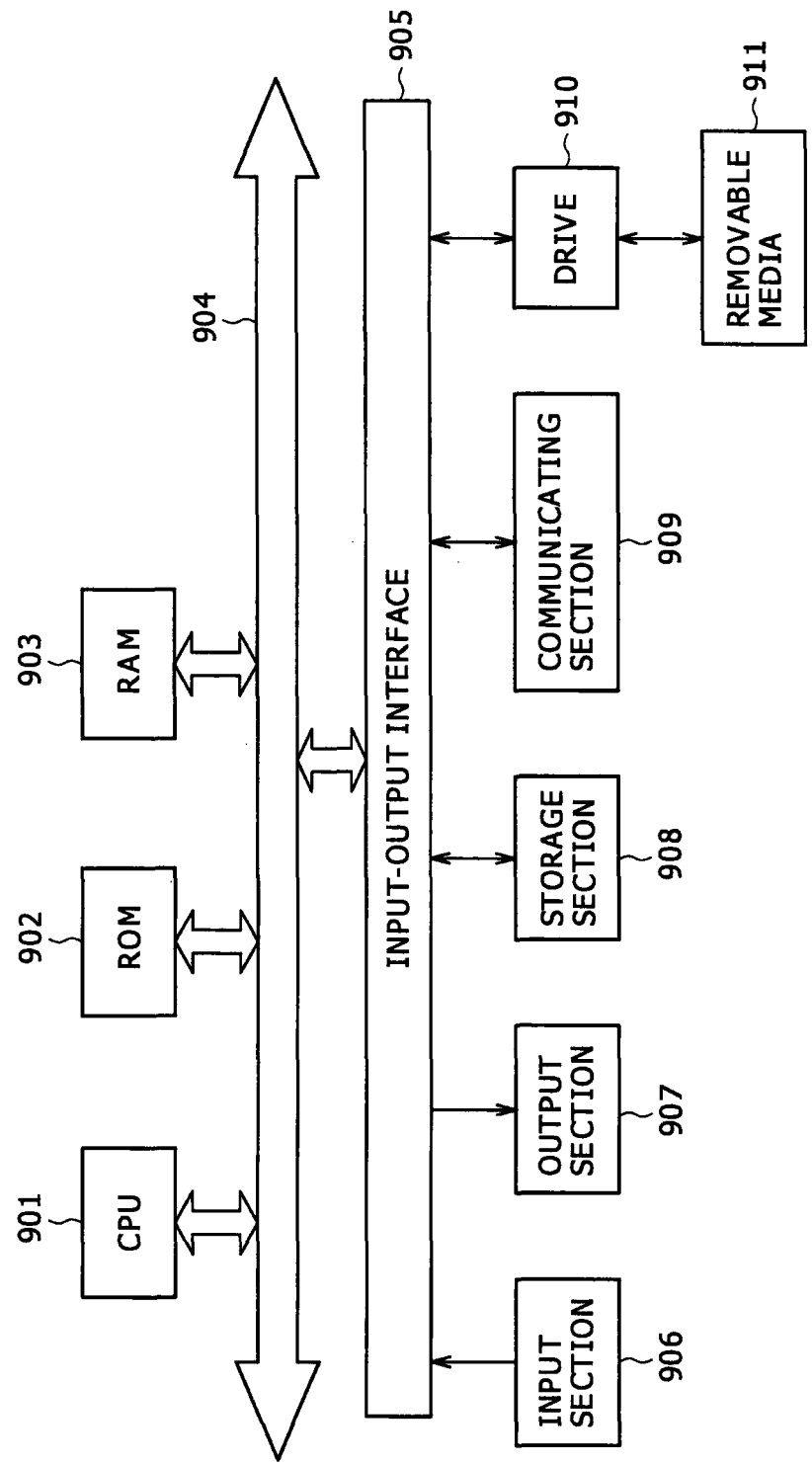

IMAGE PROCESSING DEVICE, IMAGE PROCESSING METHOD, AND COMPUTER PROGRAM FOR PERFORMING SUPER RESOLUTION

BACKGROUND OF THE INVENTION

1. Field of the Invention

The present invention relates to an image processing device, an image processing method, and a program, and particularly to an image processing device, an image processing method, and a program for performing super resolution processing that increases the resolution of an image.

2. Description of the Related Art

Super resolution (SR) is known as a technique for generating an image of high resolution from an image of low resolution. Super resolution (SR) generates an image of high resolution from an image of low resolution.

As a technique of super resolution processing, there is for example a reconstruction type super resolution technique that derives parameters indicating photographing conditions such as "blurs caused by a lens and atmospheric scattering," "motion of a subject and a camera as a whole," and "sampling by an image pickup element" on the basis of a photographed image of low resolution, and which estimates an ideal high-resolution image using these parameters.

Japanese Patent Laid-Open No. 2008-140012, for example, discloses a related-art technique in relation to a technique of the super resolution processing.

Outlines of the procedure of the reconstruction type super resolution technique are as follows.

(1) An image photographing model in which a blur, motion, sampling and the like are taken into account is expressed by a numerical formula.

(2) A cost calculating equation is obtained from the image photographing model expressed by the above numerical formula model. At this time, a regularization term of a priori probability or the like may be added using a Bayesian theory.

(3) An image minimizing the cost is obtained.

The reconstruction type super resolution technique obtains a super resolution image by these processes. While a high-resolution image obtained by the reconstruction type super resolution technique is dependent on an input image, a high degree of super resolution effect (resolution restoring effect) is obtained.

FIG. 1 shows an example of a circuit configuration for performing super resolution processing. FIG. 1 shows an example of a circuit configuration of a super resolution processing device 10.

In the image processing device 10, a low-resolution image $g_n$ 31 as an object of processing for increasing resolution is input to an upsampling section 11. The upsampling section 11 performs conversion of the number of pixels (image enlarging processing). Specifically, the upsampling section 11 performs the image enlarging processing that adjusts the number of pixels of the input image to the number of pixels of an image to be output (SR processed image $f_n$ 32), for example processing that divides one pixel into a plurality of pixels and which sets the plurality of pixels.

A motion estimated/motion compensated image generating section 12 detects the magnitude of a motion between a high-resolution image generated in the processing of a previous frame and the upsampled low-resolution image $g_n$. Specifically, the motion estimated/motion compensated image generating section 12 calculates a motion vector. Further, using the detected motion vector, the motion estimated/motion compensated image generating section 12 performs motion compensation processing (MC) on the high-resolution image $f_{n-1}$. A motion compensated image, which results from the motion compensation processing on the high-resolution image $f_{n-1}$ and in which the position of a subject is set to be the same as in the upsampled low-resolution image $g_n$, is thereby generated. However, when there is a moving subject or the like within the image, an image region in which the position of the subject is displaced from the upsampled low-resolution image $g_n$, that is, a motion compensation failure region may occur in the motion compensated image.

A motion determining section 13 compares the motion compensated high-resolution image generated by the motion compensation (MC) processing and the upsampled low-resolution image with each other, and detects a region in which motion compensation cannot be applied well, that is, the above-described motion compensation failure region. The motion compensation failure region occurs in an image part where the subject itself is moving as described above, for example.

The motion determining section 13 generates motion region information ($\alpha$-map [0:1]), which distinguishes a region in the motion compensated image of the high-resolution image $f_{n-1}$ in which region the position of the subject is set to be the same as in the upsampled low-resolution image $g_n$ as a motion compensation success region and distinguishes a region in the motion compensated image of the high-resolution image $f_{n-1}$ in which region the position of the subject is not set to be the same as in the upsampled low-resolution image $g_n$ as a motion compensation failure region. The motion determining section 13 then outputs the motion region information ($\alpha$-map [0:1]). The motion region information ($\alpha$-map [0:1]) is a map in which values in a range of one to zero are set according to reliability of success regions and failure regions. The motion region information ($\alpha$-map [0:1]) can also be set simply as a map in which one is set as a motion compensation success region and zero is set as a motion compensation failure region, for example.

A blend processing section 14 is supplied with:

the motion compensation result image resulting from the motion compensation processing on the high-resolution image $f_{n-1}$, the motion compensation result image being generated by the motion estimated/motion compensated image generating section 12;

the upsampled image obtained by upsampling the low-resolution image ($g_n$) 31 in the upsampling section 11; and the motion region information ($\alpha$-map [0:1]).

Using these pieces of input information, the blend processing section 14 outputs a blended image as a blend result on the basis of the following equation.

Blended Image=(1−$\alpha$)(Upsampled Image)+$\alpha$(Motion Compensation Result Image)

This blend processing generates a blended image in which the blend ratio of the motion compensation result image is raised for a motion compensation success region and the blend ratio of the motion compensation result image is lowered for a motion compensation failure region.

A blur adding section 15 is supplied with the blended image generated by the blend processing section 14, and performs simulation of degradation in spatial resolution. For example, the blur adding section 15 performs convolution into the image with a point spread function measured in advance as a filter.

A downsampling section 16 performs the processing of downsampling the high-resolution image to the same resolution as that of the input image. Thereafter, a difference unit 17 calculates the difference value of each pixel between the output image of the downsampling section 16 and the low-resolution image $g_n$. The difference value is subjected to upsampling processing in an upsampling section 18. Further, an inverse blur adding section 19 performs processing reverse to the blur addition processing. As an operation, processing corresponding to calculation of a correlation with the PSF (Point Spread Function) used in the blur adding section 15 is performed.

The output of the inverse blur adding section 19 is multiplied by a feedback coefficient γ set in a multiplier 20 in advance, thereafter output to an adder 21 to be added to the blended image output by the blend processing section 14, and then output.

The output of the adder 21 is an image (SR processed image 32) obtained by converting the input image $g_n$ 31 to high resolution.

The processing performed by the super resolution processing device 10 shown in FIG. 1 can be expressed by an equation as follows.

$$f_n^{SR} = (W_n f_{n-1}^{SR})' + \gamma_{SR} H^T D^T (g_n - DH(W_n f_{n-1}^{SR})') \quad \text{(Equation 1)}$$

Incidentally, each parameter in the above equation (Equation 1) is the following parameters.

n: frame number (an (n−1)th frame and an nth frame are for example consecutive frames of a moving image)

$g_n$: input image (low-resolution image of the nth frame)

$f_n^{SR}$: super resolution processing result image (=high-resolution image) of the nth frame $f_{n-1}^{SR}$: super resolution processing result image (=high-resolution image) of the (n−1)th frame $W_n$: motion information (a motion vector, a matrix or the like) of the nth frame with respect to the (n−1)th frame H: blur addition processing (blur filter matrix)

D: downsampling processing (downsampling processing matrix)

$(W_n f_{n-1}^{SR})'$: the blended image output by the blend processing section $\gamma_{SR}$: feedback coefficient $H^T$: the transposed matrix of H $D^T$: the transposed matrix of D Problems in the case of constructing hardware for realizing the super resolution processing circuit 10 shown in FIG. 1 include an increase in circuit scale and a decrease in processing efficiency. For example, filter processing is applied to the processing of the upsampling section, the downsampling section, the blur adding section, and the inverse blur adding section shown in FIG. 1, and a RAM for storing pixel values is necessary to perform these many pieces of filtering processing. When the number of filtering taps is increased, a necessary memory capacity is also increased, and a high-performance CPU and the like are necessary to make high-speed memory access. There is thus a fear of an increase in hardware size and an increase in cost.

SUMMARY OF THE INVENTION

The present invention has been made in view of the above-described problems, for example. It is desirable to provide an image processing device, an image processing method, and a program for realizing super resolution processing by which a reduction in circuit scale and an improvement in processing efficiency are achieved.

According to a first embodiment of the present invention, there is provided an image processing device including: an upsampling section configured to perform upsampling processing adjusting an input image of a first resolution to a number of pixels of an image of a second resolution higher than the first resolution; a motion compensated image generating section configured to generate a motion compensated image by correction processing adjusting a reference image having the second resolution to a subject position of an upsampled image obtained by the upsampling processing using difference information between the upsampled image and the reference image; a blend processing section configured to compare the upsampled image and the motion compensated image with each other in image region units, set a blend ratio of the reference image higher in a region of a higher degree of coincidence of region unit pixel values, and generate a blended image by blending the upsampled image and the reference image with each other; and an output image generating section configured to generate difference information between the blended image and the input image, and generate a high-resolution image having the second resolution by synthesizing the blended image and the difference information; wherein the output image generating section has a constitution in which filtering processing necessary to generate the difference information is performed twice or less.

Further, in one embodiment of the image processing device according to the present invention, the output image generating section includes: a blur adding section configured to perform blur addition processing on the blended image; a subsampling section configured to perform pixel discrete reduction processing reducing an output image of the blur adding section to a number of constituent pixels of the first resolution; a difference unit configured to output difference information between corresponding pixel values of the input image and an output image of the subsampling section; a zero padding processing section configured to perform zero pixel value padding processing to adjust a difference image output by the difference unit to the number of pixels of the second resolution; an inverse blur adding section configured to perform inverse blur addition processing, the inverse blur addition processing being reverse to the blur addition processing, on a result of processing of the zero padding processing section; a multiplier configured to multiply an output image of the inverse blur adding section by a feedback coefficient set in advance; and an adder configured to add together corresponding pixel values between the blended image and an output of the multiplier.

Further, in one embodiment of the image processing device according to the present invention, the output image generating section includes: a downsampling section configured to perform downsampling processing reducing the blended image to a number of constituent pixels of the first resolution; a difference unit configured to output difference information between corresponding pixel values of the input image and an output image of the downsampling section; an upsampling section configured to perform upsampling processing to adjust a difference image output by the difference unit to the number of pixels of the second resolution; a multiplier configured to multiply an output image of the upsampling section by a feedback coefficient set in advance; and an adder configured to add together corresponding pixel values between the blended image and an output of the multiplier.

Further, in one embodiment of the image processing device according to the present invention, the output image generating section includes: an integrated filter configured to perform downsampling processing reducing the blended image to a number of constituent pixels of the first resolution and perform upsampling processing adjusting the blended image to the number of pixels of the second resolution; a first multiplier configured to multiply an output of the integrated filter by a feedback coefficient set in advance; a difference unit configured to calculate a difference between corresponding pixel values of the blended image and an output of the first multiplier; a second multiplier configured to multiply an output of an upsampling section configured to perform upsampling processing on the input image by the feedback coefficient set in advance; and an adder configured to add together an output of the difference unit and an output of the second multiplier.

Further, in one embodiment of the image processing device according to the present invention, the integrated filter is formed by a polyphase filter configured to convolve a different value for each phase.

Further, according to a second embodiment of the present invention, there is provided an image processing method for performing resolution conversion processing in an image processing device, the image processing method including: an upsampling processing step of an upsampling section performing upsampling processing adjusting an input image of a first resolution to a number of pixels of an image of a second resolution higher than the first resolution; a motion compensated image generating step of a motion compensated image generating section generating a motion compensated image by correction processing adjusting a reference image having the second resolution to a subject position of an upsampled image obtained by the upsampling processing using difference information between the upsampled image and the reference image; a blend processing step of a blend processing section comparing the upsampled image and the motion compensated image with each other in image region units, setting a blend ratio of the reference image higher in a region of a higher degree of coincidence of region unit pixel values, and generating a blended image by blending the upsampled image and the reference image with each other; and an output image generating step of an output image generating section generating difference information between the blended image and the input image, and generating a high-resolution image having the second resolution by synthesizing the blended image and the difference information; wherein the output image generating step generates the high-resolution image by processing in which filtering processing necessary to generate the difference information is performed twice or less.

Further, according to a third embodiment of the present invention, there is provided a program for making resolution conversion processing performed in an image processing device, the program including: an upsampling processing step of making an upsampling section perform upsampling processing adjusting an input image of a first resolution to a number of pixels of an image of a second resolution higher than the first resolution; a motion compensated image generating step of making a motion compensated image generating section generate a motion compensated image by correction processing adjusting a reference image having the second resolution to a subject position of an upsampled image obtained by the upsampling processing using difference information between the upsampled image and the reference image; a blend processing step of making a blend processing section compare the upsampled image and the motion compensated image with each other in image region units, set a blend ratio of the reference image higher in a region of a higher degree of coincidence of region unit pixel values, and generate a blended image by blending the upsampled image and the reference image with each other; and an output image generating step of making an output image generating section generate difference information between the blended image and the input image, and generate a high-resolution image having the second resolution by synthesizing the blended image and the difference information; wherein the output image generating step makes the high-resolution image generated by processing in which filtering processing necessary to generate the difference information is performed twice or less.

Incidentally, a program according to an embodiment of the present invention is for example a program that can be provided by a storage medium or a communication medium provided in a computer readable form to an information processing device or a computer system capable of executing various program codes. By providing such a program in a computer readable form, processing corresponding to the program is realized on the information processing device or the computer system.

The above and other aims, features and advantages of the present invention will become apparent from more detailed description on the basis of embodiments of the present invention to be described later and the accompanying drawings. Incidentally, a system in the present specification is a logical set configuration of a plurality of devices, and is not limited to the devices of respective configurations within an identical casing.

According to the configuration of one embodiment of the present invention, a device and a method for realizing super resolution processing in which filtering processing is simplified are provided. For example, a high-resolution image is generated by the following processing. An upsampled image obtained by adjusting an input image of a low resolution to the number of pixels possessed by a high-resolution image is generated, and a motion compensated image obtained by adjusting a reference image of the high resolution to the subject position of the upsampled image is generated. Further, the upsampled image and the motion compensated image are compared with each other in image region units, the blend ratio of the reference image is set higher in a region of a higher degree of coincidence of region unit pixel values, and a blended image is generated by blending the upsampled image and the reference image with each other. Further, a difference between the blended image and the input image is generated, and a high-resolution image is generated by synthesizing the blended image and the difference information. In the configuration of one embodiment of the present invention, filtering processing necessary for generating the difference information is performed twice or less, so that miniaturization of the device and an improvement in processing efficiency are achieved.

BRIEF DESCRIPTION OF THE DRAWINGS

FIG. 2 is a diagram of assistance in explaining an example of configuration of an image processing device according to a first embodiment of the present invention which device performs super resolution processing;

FIG. 3 is a diagram of assistance in explaining an example of configuration of an image processing device according to a second embodiment of the present invention which device performs super resolution processing;

FIG. 4 is a diagram of assistance in explaining an example of configuration of an image processing device according to a third embodiment of the present invention which device performs super resolution processing; and FIG. 5 is a diagram of assistance in explaining an example of hardware configuration of an image processing device according to an embodiment of the present invention.

DETAILED DESCRIPTION OF THE PREFERRED EMBODIMENTS

Figure 1:
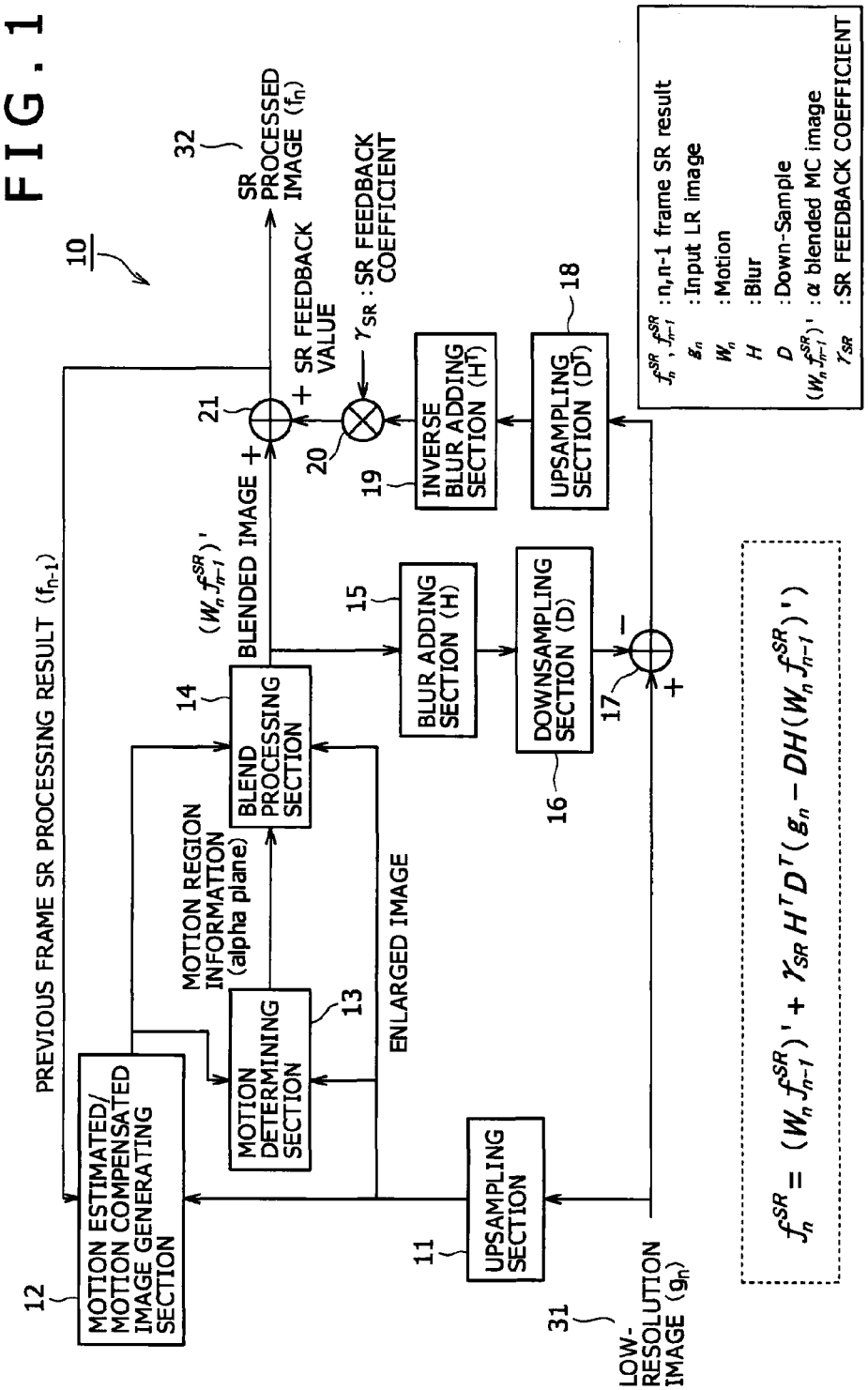
FIG. 1 is a diagram of assistance in explaining an example of a related-art circuit configuration for performing super resolution processing.

Details of an image processing device, an image processing method, and a program according town embodiment of the present invention will hereinafter be described with reference to the drawings. Incidentally, description will be made according to the following items.
1. Image Processing Device for Performing Super Resolution Processing by Configuration in which Filter Processing Sections are Integrated
   1-1. First Embodiment
   1-2. Second Embodiment
   1-3. Third Embodiment
2. Example of Hardware Configuration of Image Processing Device

[1. Image Processing Device for Performing Super Resolution Processing by Configuration in which Filter Processing Sections are Integrated]

Description will be made of an image processing device for performing super resolution processing by a configuration in which filter processing sections are integrated.

As described earlier with reference to FIG. 1, a circuit for performing super resolution processing includes processing sections such as an upsampling section, a downsampling section, a blur adding section, and an inverse blur adding section. Filter processing is applied to the processing of these processing sections. A RAM for storing pixel values is necessary to perform these many pieces of filtering processing, and when the number of filtering taps is increased, a necessary memory capacity is also increased. In addition, a high-performance CPU and the like are necessary to make high-speed memory access. There is thus a fear of an increase in hardware size and an increase in cost.

An image processing device to be described below realizes simplification of filtering processing in super resolution processing.

1-1. First Embodiment

An example of configuration of an image processing device 100 according to a first embodiment of the present invention will be described with reference to FIG. 2.

As with the circuit described earlier with reference to FIG. 1, the image processing device 100 shown in FIG. 2 is supplied with a low-resolution image $g_n$ 131, performs super resolution processing, and outputs a high-resolution image $f_n$ (=SR processed image 132).

A difference from the configuration described with reference to FIG. 1 is the configuration of an output image generating section 130 shown in FIG. 2. Specifically, changes in configuration are made as follows.

The downsampling section 16 in FIG. 1 is changed to a subsampling section 116 for performing simple pixel discrete reduction processing in the configuration of FIG. 2.

The upsampling section 18 in FIG. 1 is changed to a zero padding processing section for adding a pixel value of zero to increased pixel parts attendant on an increase in the number of pixels in the configuration of FIG. 2.

The other configurations are similar to those shown in FIG. 1.

In the image processing device 100, a low-resolution image $g_n$ as an object of processing for increasing resolution is input to an upsampling section 111. The upsampling section 111 performs conversion of the number of pixels (image enlarging processing). Specifically, the upsampling section 111 performs the image enlarging processing that adjusts the number of pixels of the input image to the number of pixels of an image to be output, for example processing that divides one pixel into a plurality of pixels and which sets the plurality of pixels. That is, the upsampling section 111 performs upsampling processing that adjusts the input image of a first resolution (low resolution) to the number of pixels of an image of a second resolution (high resolution) higher than the first resolution (low resolution).

A motion estimated/motion compensated image generating section 112 detects the magnitude of a motion between a high-resolution image $f_{n-1}$ generated in the processing of a previous frame and used as a reference image and the upsampled low-resolution image $g_n$. Specifically, the motion estimated/motion compensated image generating section 112 calculates a motion vector. Further, using the detected motion vector, the motion estimated/motion compensated image generating section 112 performs motion compensation processing on the high-resolution image used as the reference image. A motion compensated image, which results from motion compensation processing on the high-resolution image $f_{n-1}$ and in which the position of a subject is set to be the same as in the upsampled low-resolution image $g_n$, is thereby generated.

A motion determining section 113 compares the motion compensated high-resolution image generated by the motion compensation (MC) processing and the upsampled low-resolution image with each other, and detects a region in which motion compensation cannot be applied well. When the subject itself is moving, for example, there occurs a motion compensation failure region.

The motion determining section 113 generates motion region information (α-map [0:1]), which distinguishes a region in the motion compensated image of the high-resolution image $f_{n-1}$ as the reference image in which region the position of the subject is set to be the same as in the upsampled low-resolution image $g_n$ as a motion compensation success region and distinguishes a region in the motion compensated image of the high-resolution image $f_{n-1}$ as the reference image in which region the position of the subject is not set to be the same as in the upsampled low-resolution image $g_n$ as a motion compensation failure region. The motion determining section 113 then outputs the motion region information (α-map [0:1]).

A blend processing section 114 is supplied with:
the motion compensation result image resulting from the motion compensation processing on the high-resolution image $f_{n-1}$, the motion compensation result image being generated by the motion estimated/motion compensated image generating section 112;
the upsampled image obtained by upsampling the low-resolution image $g_n$ in the upsampling section 111; and
the motion region information (α-map [0:1]).

Using these pieces of input information, the blend processing section 114 outputs a blended image as a blend result on the basis of the following equation.

Blended Image=(1−a)(Upsampled Image)+α(Motion Compensation Result Image)

The blend processing section 114 compares the upsampled image and the motion compensated image with each other in image region units, sets the blend ratio of the reference image higher in a region of a higher degree of coincidence of region unit pixel values, and generates the blended image by blending the upsampled image and the reference image with each other.

The output image generating section 130 generates difference information between the blended image and the input image, and generates a high-resolution image having the second resolution by synthesizing the blended image and the difference information.

Processing within the output image generating section 130 will be described.

A blur adding section 115 is supplied with the blended image generated by the blend processing section 114, and performs blur addition processing on the blended image. Specifically, the blur adding section 115 performs the blur addition processing on the blended image by simulation of degradation in spatial resolution. For example, the blur adding section 115 performs convolution into the image with a point spread function measured in advance as a filter.

A subsampling section 116 performs the processing of downsampling the high-resolution image to the same resolution as that of the input image. The subsampling section 116 in the configuration according to the present embodiment performs the processing of simple discrete reduction of pixels. Specifically, the subsampling section 116 performs the pixel discrete reduction processing that decreases the blended image output by the blur adding section 115 to the number of constituent pixels of the same first resolution (low resolution) as that of the input image.

Thereafter, a difference unit 117 calculates the difference value of each pixel between the output image of the subsampling section 116 and the low-resolution image $g_n$. The difference unit 117 outputs difference information on differences between the corresponding pixel values of the input image and the output image of the subsampling section.

A zero padding processing section 118 performs zero pixel value padding processing for adjusting the difference image output by the difference unit 117 to the number of pixels of an image of a second resolution (high resolution). That is, the zero padding processing section 118 performs zero padding processing that sets a pixel value of zero at increased pixel positions as processing for converting the difference image output by the difference unit 117 to the number of pixels corresponding to a high-resolution image to be generated.

Further, an inverse blur adding section 119 performs processing reverse to the blur addition processing. As an operation, processing corresponding to calculation of a correlation with the PSF (Point Spread Function) used in the blur adding section 115 is performed.

The output of the inverse blur adding section 119 is multiplied by a feedback coefficient γ set in a multiplier 120 in advance, thereafter output to an adder 121 to be added to the blended image output by the blend processing section 114, and then output.

The output of the adder 121 is an image (SR processed image) obtained by converting the input image $g_n$ to high resolution.

The processing performed in the configuration shown in FIG. 2 can be expressed by the following equation.

$$f_n^{SR}=(W_n f_{n-1}^{SR})'+\gamma_{SR} H^T D^T(g_n-DH(W_n f_{n-1}^{SR})')\quad\text{(Equation 2)}$$

Incidentally, each parameter in the above equation (Equation 2) is the following parameters.

n: frame number (an (n−1)th frame and an nth frame are for example consecutive frames of a moving image)

$g_n$: input image (low-resolution image of the nth frame)

$f_n^{SR}$: super resolution processing result image (=high-resolution image of the nth frame)

$f_{n-1}^{SR}$: super resolution processing result image (=high-resolution image of the (n−1)th frame)

$W_n$: motion information (a motion vector, a matrix or the like) of the nth frame with respect to the (n−1)th frame H: blur addition processing (blur filter matrix)

D: downsampling processing (downsampling processing matrix)

$(W_n f_{n-1}^{SR})'$: the blended image output by the blend processing section $\gamma_{SR}$: feedback coefficient $H^T$: the transposed matrix of H $D^T$: the transposed matrix of D The above equation is similar to the equation described with reference to FIG. 1.

The discrete reduction processing performed by the subsampling section 116 corresponds to [D=downsampling processing]. The processing performed by the zero padding processing section 118 corresponds to [$D^T$=upsampling processing].

In the image processing device 100 shown in FIG. 2, the downsampling section 16 in FIG. 1 is changed to the subsampling section 116 for performing simple pixel discrete reduction processing, and the upsampling section 18 in FIG. 1 is changed to the zero padding processing section for adding a pixel value of zero to increased pixel parts attendant on an increase in the number of pixels.

This processing eliminates a need for filtering processing in these processing sections, and eliminates a need for a memory for storing pixel values and memory access processing, so that miniaturization of the device and an improvement in processing efficiency are achieved.

That is, in the processing of generating the difference information between the blended image and the input image (low-resolution image $g_n$ 131) which processing is performed within the output image generating section 130, filtering processing is performed in only the blur adding section 115 and the inverse blur adding section 119, and thus the filtering processing is performed only twice within the output image generating section 130. Thus, the constitution of the present embodiment reduces the filtering processing, and eliminates a need for a memory for storing pixel values and memory access processing, so that miniaturization of the device and an improvement in processing efficiency are achieved.

1-2. Second Embodiment

An image processing device 150 according to a second embodiment of the present invention will next be described with reference to FIG. 3.

As with the circuits described with reference to FIG. 1 and FIG. 2, the image processing device 150 shown in FIG. 3 is supplied with a low-resolution image $g_n$ 131, performs super resolution processing, and outputs a high-resolution image $f_n$ (=SR processed image 132).

The image processing device 150 shown in FIG. 3 has a configuration even simpler than the configuration shown in FIG. 2.

Description will be made centering on differences from the image processing device 100 shown in FIG. 2.

In the image processing device 150 shown in FIG. 3, an output image generating section 140 shown in FIG. 3 has a configuration different from the configuration shown in FIG. 2. Specifically, changes are made as follows.

The blur adding section 115 and the subsampling section 116 shown in FIG. 2 are integrated into a downsampling section 151 shown in FIG. 3.

The zero padding processing section 118 and the inverse blur adding section 119 shown in FIG. 2 are integrated into an upsampling section 152 shown in FIG. 3.

Other processing sections have a configuration similar to that shown in FIG. 2.

The downsampling section 151 shown in FIG. 3 performs the two pieces of processing performed by the blur adding section 115 and the subsampling section 116 shown in FIG. 2 as one time of filtering processing.

The downsampling section 151 performs downsampling processing that reduces a blended image output by a blend processing section 114 to the number of constituent pixels of an image of a first resolution (low resolution).

Similarly, the upsampling section 152 shown in FIG. 3 performs the two pieces of processing performed by the zero padding processing section 118 and the inverse blur adding section 119 shown in FIG. 2 as one time of filtering processing. The upsampling section 152 performs upsampling processing that adjusts a difference image output by the difference unit 117 to the number of pixels of an image of a second resolution (high resolution).

The processing performed in the configuration of FIG. 3 can be expressed by an equation as follows.

$$f_n^{SR} = (W_n f_{n-1}^{SR})' + \gamma_{SR} H^T D^T (g_n - DH(W_n f_{n-1}^{SR})') \quad \text{(Equation 3)}$$

This equation (Equation 3) is similar to the equation expressing the processing performed in the configurations of FIG. 1 and FIG. 2.

In the configuration of FIG. 3, as described above, the downsampling section 151 performs the two pieces of processing performed by the blur adding section 115 and the subsampling section 116 shown in FIG. 2 as one time of filtering processing, and the output of the downsampling section 151 is expressed as follows, as shown in FIG. 3.

$$DH(W_n f_{n-1}^{SR})'$$

In addition, the output of the difference unit 117 is expressed as follows, as shown in FIG. 3.

$$g_n - DH(W_n f_{n-1}^{SR})'$$

Further, the output of the upsampling section 152 is expressed as follows, as shown in FIG. 3.

$$H^T D^T (g_n - DH(W_n f_{n-1}^{SR})')$$

Incidentally, each parameter is similar to that described in the first embodiment.

Thus, in the image processing device 150 shown in FIG. 3, the downsampling section 151 performs the two pieces of processing performed by the blur adding section 115 and the subsampling section 116 shown in FIG. 2 as one time of filtering processing, and the upsampling section 152 performs the two pieces of processing performed by the zero padding processing section 118 and the inverse blur adding section 119 shown in FIG. 2 as one time of filtering processing.

As compared with the configuration shown in FIG. 2, the configuration is simplified, and the number of pieces of filtering processing is reduced. As a result, miniaturization of hardware configuration, a reduction in cost, and an improvement in processing efficiency are achieved.

1-3. Third Embodiment

An example of configuration of an image processing device 180 according to a third embodiment of the present invention will next be described with reference to FIG. 4.

As with the circuits described with reference to FIGS. 1 to 3, the image processing device 180 shown in FIG. 4 is supplied with a low-resolution image $g_n$ 131, performs super resolution processing, and outputs a high-resolution image $f_n$ (=SR processed image 132).

The image processing device 180 shown in FIG. 4 has a configuration even simpler than the configuration shown in FIG. 3.

Description will be made centering on differences from the image processing device 150 shown in FIG. 3.

In the image processing device 180 shown in FIG. 4, an output image generating section 170 shown in FIG. 4 has a configuration different from the configuration shown in FIG. 3. Specifically, changes are made as follows.

The two upsampling sections shown in FIG. 3, that is, the upsampling section 111 and the upsampling section 152 are integrated into one upsampling section 181 in the configuration shown in FIG. 4.

Further, the downsampling section 151 and the difference unit 117 shown in FIG. 3 are replaced with an integrated filter (polyphase filter) 182 in the configuration shown in FIG. 4.

The integrated filter (polyphase filter) 182 performs downsampling processing that reduces a blended image generated by a blend processing section 114 to the number of constituent pixels of an image of a first resolution (low resolution) and upsampling processing that adjusts the blended image to the number of pixels of an image of a second resolution (high resolution). The integrated filter (polyphase filter) 182 is for example a polyphase filter, and performs filtering processing that convolves a different value for each phase.

Incidentally, with the change in configuration of the output image generating section 170, the image processing device 180 is provided with a multiplier 183 for multiplying the output of the integrated filter (polyphase filter) 182 by an SR feedback coefficient and a difference unit 184 for subtracting the output of the multiplier 183 from the blended image output by the blend processing section.

The output of the difference unit 184 is output to an adder 121 to be added to an SR feedback value.

The processing performed by the image processing device 180 shown in FIG. 4 can be expressed by the following equation.

$$\begin{aligned} f_n^{SR} &= (W_n f_{n-1}^{SR})' + \gamma_{SR} H^T D^T (g_n - DH(W_n f_{n-1}^{SR})') \quad \text{(Equation 4)} \\ &= (W_n f_{n-1}^{SR})' - \gamma_{SR} H^T D^T DH(W_n f_{n-1}^{SR})' + \\ &\quad \gamma_{SR} H^T D^T g_n \\ &= (I - \gamma_{SR} H^T D^T DH)(W_n f_{n-1}^{SR})' + \gamma_{SR} H^T D^T g_n \end{aligned}$$

A first row in this equation is the same as the equation expressing the processing performed in the configurations of FIGS. 1 to 3. A second row and a third row are a result of modification of the equation. The equation in the third row corresponds to the configuration shown in FIG. 4.

That is, the upsampling section 181 performs processing corresponding to inverse blur addition processing ($H^T$) and upsampling processing ($D^T$), and the output of the upsampling section 181 can be expressed by the following equation, as shown in FIG. 4.

$$H^T D^T g_n$$

In addition, the integrated filter (polyphase filter) 182 performs downsampling processing that reduces a blended image to the number of constituent pixels of an image of a first resolution (low resolution) corresponding to an input image and upsampling processing that adjusts the blended image to the number of pixels of an image of a second resolution (high resolution). The integrated filter (polyphase filter) 182 is for example formed by a polyphase filter that convolves a different value for each phase.

This filtering processing can be expressed as $$H^T D^T DH$$

The output of the integrated filter (polyphase filter) 182 is $$(H^T D^T DH)(W_n f_{n-1}^{SR})'$$

In addition, the output of the difference unit 184 in FIG. 4 corresponds to a first half part of the above equation (Equation 4), as shown in (A) in FIG. 4, and can be expressed as $$(1-\gamma_{SR} H^T D^T DH)(W_n f_{n-1}^{SR})'$$

In addition, the output of a multiplier 120 in FIG. 4 corresponds to a second half part of the above equation (Equation 4), as shown in (B) in FIG. 4, and can be expressed as $$\gamma_{SR} H^T D^T DH g_n$$

As a result, the output of the adder 121 is a value expressed by the above equation (Equation 4), that is, $$f_n^{SR} = (1-\gamma_{SR} H^T D^T DH)(W_n f_{n-1}^{SR})' + \gamma_{SR} H^T D^T DH g_n$$

This equation is equivalent to the processing in the configurations of FIGS. 1 to 3, as is understood from the expansion of the above-described Equation 4. A super resolution processing result $f_n^{SR}$ is output by using the configuration shown in FIG. 4.

In the image processing device 180 shown in FIG. 4, filtering processing is performed by the upsampling section 181 and the integrated filter (polyphase filter) 182. As compared with the configuration shown in FIG. 1, the configuration that needs filter processing is reduced. As a result, miniaturization of hardware configuration, a reduction in cost, and an improvement in processing efficiency are achieved.

[2. Example of Hardware Configuration of Image Processing Device]

Finally, one example of hardware configuration of an image processing device performing the above-described processing will be described with reference to FIG. 5. A CPU (Central Processing Unit) 901 performs various kinds of processing according to a program stored in a ROM (Read Only Memory) 902 or a storage section 908. The CPU 901 performs image processing such as super resolution processing described in each of the foregoing embodiments, for example. A RAM (Random Access Memory) 903 stores the program executed by the CPU 901, data, and the like as appropriate. The CPU 901, the ROM 902, and the RAM 903 are interconnected by a bus 904.

The CPU 901 is connected to an input-output interface 905 via the bus 904. The input-output interface 905 is connected with an input section 906 formed by a keyboard, a mouse, a microphone and the like, and an output section 907 formed by a display, a speaker and the like. The CPU 901 performs various kinds of processing in response to a command input from the input section 906, and outputs a result of the processing to the output section 907, for example.

The storage section 908 connected to the input-output interface 905 is formed by a hard disk, for example. The storage section 908 stores the program executed by the CPU 901 and various kinds of data. A communicating section 909 communicates with an external device via a network such as the Internet, a local area network, or the like.

A drive 910 connected to the input-output interface 905 drives removable media 911 such as a magnetic disk, an optical disk, a magneto-optical disk, a semiconductor memory and the like, and obtains a program, data and the like recorded on the removable media 911. The program and the data obtained are transferred to the storage section 908 and stored in the storage section 908 as required.

The present invention has been explained above in detail with reference to specific embodiments thereof. It is obvious, however, that modifications and substitutions in the embodiments may be made by those skilled in the art without departing from the spirit of the present invention. That is, the present invention has been disclosed in a form that is illustrative and is not to be construed in a restrictive manner. In order to determine the spirit of the present invention, the section of claims is to be considered.

In addition, the series of processes described in the specification can be performed by hardware, software, or a composite configuration of both hardware and software. When processing is performed by software, a program in which a processing sequence is recorded can be executed after being installed into a memory within a computer incorporated in dedicated hardware, or executed after the program is installed on a general-purpose computer capable of performing various kinds of processing. For example, the program can be recorded on a recording medium in advance. In addition to being installed from a recording medium onto a computer, the program can be received via a network such as a LAN (Local Area Network), the Internet or the like, and installed onto a recording medium such as a built-in hard disk or the like.

It is to be noted that the various kinds of processing described in the specification may be not only performed in time series according to the description but also performed in parallel or individually according to the processing power of a device performing the processing or a requirement. In addition, a system in the present specification is a logical set configuration of a plurality of devices, and is not limited to the devices of respective configurations within an identical casing.

As described above, according to the configuration of one embodiment of the present invention, a device and a method for realizing super resolution processing in which filtering processing is simplified are provided. For example, a high-resolution image is generated by the following processing. An upsampled image obtained by adjusting an input image of a low resolution to the number of pixels possessed by a high-resolution image is generated, and a motion compensated image obtained by adjusting a reference image of the high resolution to the subject position of the upsampled image is generated. Further, the upsampled image and the motion compensated image are compared with each other in image region units, the blend ratio of the reference image is set higher in a region of a higher degree of coincidence of region unit pixel values, and a blended image is generated by blending the upsampled image and the reference image with each other. Further, a difference between the blended image and the input image is generated, and a high-resolution image is generated by synthesizing the blended image and the difference information. In the configuration of one embodiment of the present invention, filtering processing necessary for generating the difference information is performed twice or less, so that miniaturization of the device and an improvement in processing efficiency are achieved.

The present application contains subject matter related to that disclosed in Japanese Priority Patent Application JP 2010-108408 filed in the Japan Patent Office on May 10, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   an upsampling section configured to perform upsampling processing adjusting an input image of a first resolution to a number of pixels of an image of a second resolution higher than said first resolution;
   a motion compensated image generating section configured to generate a motion compensated image by correction processing adjusting a reference image having said second resolution to a subject position of an upsampled image obtained by said upsampling processing using difference information between said upsampled image and said reference image;
   a blend processing section configured to compare said upsampled image and said motion compensated image with each other in image region units, set a blend ratio of the reference image higher in a region of a higher degree of coincidence of region unit pixel values, and generate a blended image by blending said upsampled image and said reference image with each other; and
   an output image generating section configured to generate difference information between said blended image and said input image, and generate a high-resolution image having the second resolution by synthesizing said blended image and said difference information,
   wherein said output image generating section has a constitution in which filtering processing necessary to generate said difference information is performed twice or less.

2. The image processing device according to claim 1, wherein said output image generating section includes:
   a blur adding section configured to perform blur addition processing on said blended image;
   a subsampling section configured to perform pixel discrete reduction processing reducing an output image of said blur adding section to a number of constituent pixels of said first resolution;
   a difference unit configured to output difference information between corresponding pixel values of said input image and an output image of said subsampling section;
   a zero padding processing section configured to perform zero pixel value padding processing to adjust a difference image output by the difference unit to the number of pixels of said second resolution;
   an inverse blur adding section configured to perform inverse blur addition processing, the inverse blur addition processing being reverse to said blur addition processing, on a result of processing of said zero padding processing section;
   a multiplier configured to multiply an output image of said inverse blur adding section by a feedback coefficient set in advance; and
   an adder configured to add together corresponding pixel values between said blended image and an output of said multiplier.

3. The image processing device according to claim 1, wherein said output image generating section includes:
   a downsampling section configured to perform downsampling processing reducing said blended image to a number of constituent pixels of said first resolution;
   a difference unit configured to output difference information between corresponding pixel values of said input image and an output image of said downsampling section;
   an upsampling section configured to perform upsampling processing to adjust a difference image output by the difference unit to the number of pixels of said second resolution;
   a multiplier configured to multiply an output image of said upsampling section by a feedback coefficient set in advance; and
   an adder configured to add together corresponding pixel values between said blended image and an output of said multiplier.

4. The image processing device according to claim 1, wherein said output image generating section includes:
   an integrated filter configured to perform downsampling processing reducing said blended image to a number of constituent pixels of said first resolution and perform upsampling processing adjusting said blended image to the number of pixels of said second resolution;
   a first multiplier configured to multiply an output of said integrated filter by a feedback coefficient set in advance;
   a difference unit configured to calculate a difference between corresponding pixel values of said blended image and an output of said first multiplier;
   a second multiplier configured to multiply an output of an upsampling section configured to perform upsampling processing on said input image by the feedback coefficient set in advance; and
   an adder configured to add together an output of said difference unit and an output of said second multiplier.

5. The image processing device according to claim 4, wherein said integrated filter is formed by a polyphase filter configured to convolve a different value for each phase.

6. An image processing method for performing resolution conversion processing in an image processing device, said image processing method comprising:
   an upsampling processing step of an upsampling section performing upsampling processing adjusting an input image of a first resolution to a number of pixels of an image of a second resolution higher than said first resolution;
   a motion compensated image generating step of a motion compensated image generating section generating a motion compensated image by correction processing adjusting a reference image having said second resolution to a subject position of an upsampled image obtained by said upsampling processing using difference information between said upsampled image and said reference image;
   a blend processing step of a blend processing section comparing said upsampled image and said motion compensated image with each other in image region units, setting a blend ratio of the reference image higher in a region of a higher degree of coincidence of region unit pixel values, and generating a blended image by blending said upsampled image and said reference image with each other; and
   an output image generating step of an output image generating section generating difference information between said blended image and said input image, and generating a high-resolution image having the second resolution by synthesizing said blended image and said difference information,
   wherein said output image generating step generates the high-resolution image by processing in which filtering processing necessary to generate said difference information is performed twice or less.

7. A non-transitory computer readable medium storing a computer program for making resolution conversion processing performed in an image processing device, said computer program comprising:
- an upsampling processing step of making an upsampling section perform upsampling processing adjusting an input image of a first resolution to a number of pixels of an image of a second resolution higher than said first resolution;
- a motion compensated image generating step of making a motion compensated image generating section generate a motion compensated image by correction processing adjusting a reference image having said second resolution to a subject position of an upsampled image obtained by said upsampling processing using difference information between said upsampled image and said reference image;
- a blend processing step of making a blend processing section compare said upsampled image and said motion compensated image with each other in image region units, set a blend ratio of the reference image higher in a region of a higher degree of coincidence of region unit pixel values, and generate a blended image by blending said upsampled image and said reference image with each other; and
- an output image generating step of making an output image generating section generate difference information between said blended image and said input image, and generate a high-resolution image having the second resolution by synthesizing said blended image and said difference information,
- wherein said output image generating step makes the high-resolution image generated by processing in which filtering processing necessary to generate said difference information is performed twice or less.

8. An image processing device comprising:
- upsampling means for performing upsampling processing adjusting an input image of a first resolution to a number of pixels of an image of a second resolution higher than said first resolution;
- motion compensated image generating means for generating a motion compensated image by correction processing adjusting a reference image having said second resolution to a subject position of an upsampled image obtained by said upsampling processing using difference information between said upsampled image and said reference image;
- blend processing means for comparing said upsampled image and said motion compensated image with each other in image region units, setting a blend ratio of the reference image higher in a region of a higher degree of coincidence of region unit pixel values, and generating a blended image by blending said upsampled image and said reference image with each other; and
- output image generating means for generating difference information between said blended image and said input image, and generating a high-resolution image having the second resolution by synthesizing said blended image and said difference information,
- wherein said output image generating means has a constitution in which filtering processing necessary to generate said difference information is performed twice or less.

* * * * *